(12) United States Patent
Kishimoto

(10) Patent No.: US 11,427,737 B2
(45) Date of Patent: Aug. 30, 2022

(54) PROTECTIVE FILM AND DISPLAY DEVICE HAVING THE SAME

(71) Applicant: Samsung Display Co., LTD., Yongin-si (KR)

(72) Inventor: Hirotsugu Kishimoto, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 57 days.

(21) Appl. No.: 16/893,541

(22) Filed: Jun. 5, 2020

(65) Prior Publication Data

US 2021/0095168 A1 Apr. 1, 2021

(30) Foreign Application Priority Data

Oct. 1, 2019 (KR) ........................ 10-2019-0121823

(51) Int. Cl.

| | |
|---|---|
| *C09J 11/08* | (2006.01) |
| *C09J 7/30* | (2018.01) |
| *C09J 7/35* | (2018.01) |
| *C09J 4/00* | (2006.01) |
| *G02B 5/20* | (2006.01) |
| *G02B 1/04* | (2006.01) |
| *G02B 1/14* | (2015.01) |
| *C08K 5/23* | (2006.01) |
| *C08K 9/10* | (2006.01) |
| *B32B 7/12* | (2006.01) |
| *B32B 27/06* | (2006.01) |
| *B32B 27/36* | (2006.01) |
| *B32B 27/40* | (2006.01) |
| *B32B 27/34* | (2006.01) |
| *B32B 27/32* | (2006.01) |

(52) U.S. Cl.
CPC ................. *C09J 11/08* (2013.01); *B32B 7/12* (2013.01); *B32B 27/06* (2013.01); *C09J 4/00* (2013.01); *C09J 7/35* (2018.01); *G02B 1/14* (2015.01); *B32B 2457/20* (2013.01); *C09J 2301/416* (2020.08); *C09J 2477/00* (2013.01)

(58) Field of Classification Search
None
See application file for complete search history.

(56) References Cited

U.S. PATENT DOCUMENTS

| | | | |
|---|---|---|---|
| 5,441,810 A | * | 8/1995 | Aizawa ...................... C09J 7/38 428/354 |
| 10,067,528 B2 | | 9/2018 | Lee et al. |
| 2005/0054758 A1 | * | 3/2005 | Hatai ....................... C09J 11/06 524/190 |
| 2017/0025634 A1 | * | 1/2017 | Jeong .................... G06F 1/1652 |
| 2017/0084673 A1 | | 3/2017 | Lee et al. |
| 2019/0292415 A1 | | 9/2019 | Sato et al. |

FOREIGN PATENT DOCUMENTS

| | | |
|---|---|---|
| JP | 2002-088320 A | 3/2002 |
| JP | 3308672 B2 | 7/2002 |
| JP | 4669649 B2 | 4/2011 |
| KR | 1020170024204 A | 3/2017 |
| KR | 1020170036190 A | 4/2017 |
| WO | 2018/097266 A1 | 5/2018 |

* cited by examiner

*Primary Examiner* — Sheeba Ahmed
(74) *Attorney, Agent, or Firm* — Cantor Colburn LLP

(57) ABSTRACT

A display device includes a protective film that includes an adhesive layer. The adhesive layer has a first adhesive strength at a room temperature and has a second adhesive strength equal to or smaller than about 25% of the first adhesive strength in a second state in which a heat or ultraviolet ray is provided.

18 Claims, 11 Drawing Sheets

PROTECTIVE FILM AND DISPLAY DEVICE HAVING THE SAME

This application claims priority to Korean Patent Application No. 10-2019-0121823, filed on Oct. 1, 2019, and all the benefits accruing therefrom under 35 U.S.C. § 119, the contents of which are hereby incorporated by reference in its entirety.

BACKGROUND

1. Field

The present disclosure relates to a protective film and a display device having the same. More particularly, the present disclosure relates to a protective film for a foldable display device and a display device having the protective film.

2. Description of the Related Art

A display device displays a variety of images through a display screen to provide information to a user. A display device which is flexible and includes a display panel which is flexible by being foldable or bendable, is being developed. Different from a display device which is rigid, the display device which is flexible, is designed to be folded, rolled, or curved. The display device which is flexible and whose shape is changed variously, is relative mobile (e.g., can be carried or transported regardless of a screen size), and thus, a user's convenience is improved.

SUMMARY

The present disclosure provides a protective film that remains attached to a display device even though the display device is repeatedly folded and unfolded together with the protective film.

The present disclosure provides a display device including the protective film that is replaceable without damaging a display screen and in which a decrease in adhesive strength is observable without a visual aid.

An exemplary embodiment provides a protective film including a polymer film; and an adhesive layer disposed on the polymer film, having a first adhesive strength in a first state, and having a second adhesive strength in a second state in which a heat or ultraviolet ray is provided thereto. The second adhesive strength is equal to or smaller than about 25% of the first adhesive strength.

The protective film may have a transmittance equal to or greater than about 89% in a light wavelength region from about 400 nanometers (nm) to about 800 nm.

The adhesive layer may include at least one of 2,2'-azobis(N-butyl-2-methylpropionamide), 2,2'-azobis[2-methyl-N-[1,1-bis(hydroxymethyl)-2-hydroxyethyl]-propionamide, 3-(azidomethyl)-3-methyloxetane, and 2-azidobenzene-1,4-dicarboxylic acid.

The adhesive layer may discharge a nitrogen gas in the second state.

The adhesive layer may include a base resin and a microcapsule which is in the base resin, and the microcapsule may include a core portion and an outer coating which surrounds the core portion.

An absolute value of a difference in refractive index between the base resin, the core portion, and the outer coating may be equal to or smaller than about 0.1.

The core portion may include an adhesive strength modifier including at least one of poly(2-ethylhexyl acrylate, polybutylacrylate, polyvinylacetate, polymethylmethacrylate, polyethylacrylate, polymethylacrylate, polybenzylacrylate, polyphenoxyethylacrylate, polyacrylicacid, polyhydroxyethylmethacrylate, polyglycidylmethacrylate, and polyacetoacetoxyethylmethacrylate.

The adhesive strength modifier may be discharged to an outside of the microcapsule in the second state.

The outer coating may include at least one of gelatin, natural gum, polyester, and polyamide.

The base resin may include at least one of an acrylic-based resin, a silicone-based resin, a urethane-based resin, an epoxy-based resin, a rubber-based resin, and a polyester-based resin.

A content of the microcapsule may be equal to or greater than about 1 weight percent (wt %) and equal to or smaller than about 30 wt % based on a total weight of the base resin and the microcapsule.

An exemplary embodiment provides a display device including a display module foldable with respect to at least one folding axis and a protective film disposed on the display module and including a polymer film and an adhesive layer disposed between the polymer film and the display module. The adhesive layer has a first adhesive strength and a first haze value in a first state and has a second adhesive strength and a second haze value in a second state in which a heat or ultraviolet ray is provided to the adhesive layer, the second adhesive strength is equal to or smaller than about 25% of the first adhesive strength, and the second haze value is greater than the first haze value.

The display module may include a display panel, and a window member between the display panel and the protective film, where the window member directly contacts the adhesive layer of the protective film.

An absolute value of a difference in refractive index between the polymer film and the adhesive layer may be equal to or smaller than about 0.1.

The protective film may have a transmittance greater than about 89% in a wavelength region from about 400 nm to about 800 nm.

The display module may be inwardly or outwardly folded with respect to the at least one folding axis.

The adhesive layer may have a thickness equal to or greater than about 10 micrometers ($\mu m$) and equal to or smaller than about 200 $\mu m$.

The first adhesive strength with respect to the display module may be equal to or greater than about 200 grams-force per inch (gf/inch) and equal to or smaller than about 2000 gf/inch.

The second adhesive strength with respect to the display module may be equal to or smaller than about 50 gf/inch.

The first haze value may be equal or smaller than about 4, and the second haze value may be equal to or greater than about 5.

According to the above, one or more exemplary embodiment of the protective film may have superior adhesive strength and durability even though the display device is repeatedly folded and unfolded together with the protective film therein.

In addition, one or more exemplary embodiment of the display device which is foldable, may include the protective film to which the gas generation mechanism or the thermal expansion microcapsule is applied for reducing an adhesive strength for detachment of the protective film from a display surface of the display device. Thus, damage to the display surface may be minimized when the protective film is replaced within the display device, and the reduction of the adhesive strength may be checked without a visual aid (e.g., viewable with the naked eyes).

BRIEF DESCRIPTION OF THE DRAWINGS

The above and other advantages of the present disclosure will become readily apparent by reference to the following detailed description when considered in conjunction with the accompanying drawings where.

DETAILED DESCRIPTION

Figure 1:
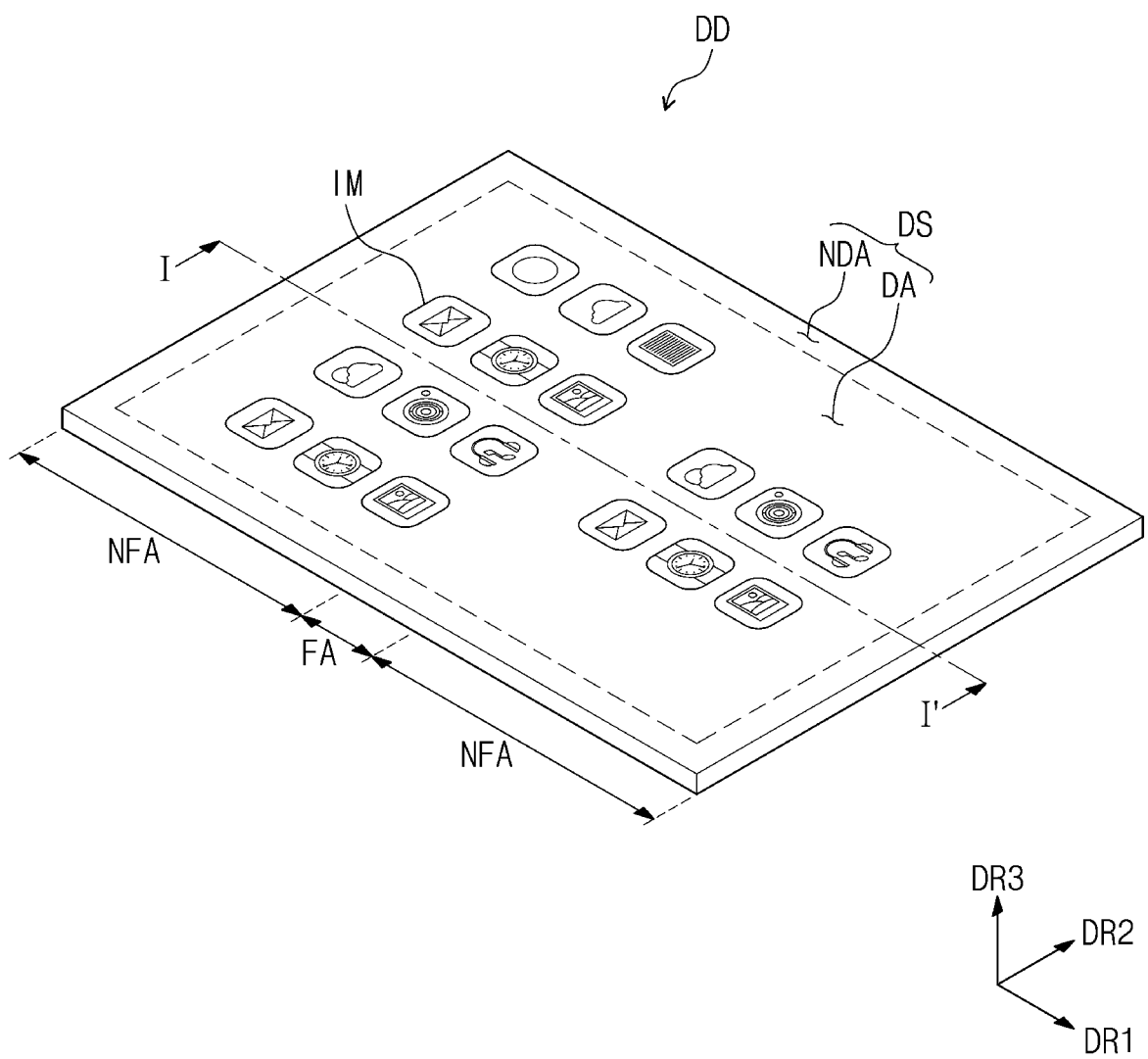
FIG. 1 is a perspective view showing an exemplary embodiment of a display device.

The present disclosure may be variously modified and realized in many different forms, and thus specific embodiments will be exemplified in the drawings and described in detail hereinbelow. However, the present disclosure should not be limited to the specific disclosed forms, and be construed to include all modifications, equivalents, or replacements included in the spirit and scope of the present disclosure.

In the present disclosure, it will be understood that when an element (or region, layer, portion, etc.) is referred to as being related to another element such as being "on," "connected to" or "coupled to" another element (or region, layer, portion, etc.), it can be directly on, connected or coupled to the other element (or region, layer, portions, etc.) or intervening elements (or regions, layers, portions, etc.) may be present.

It will be understood that when a layer, film, area, or plate is referred to as being related to another element such as being"directly on" another layer, film, area, or plate, there are no intervening layers, films, areas, or plates present. For example, it will be understood that when the layer, film, area, or plate is being "directly on" another layer, film, area, or plate, two layers or two members are arranged without using an additional member such as an adhesive member between the two layers or two members.

Like numerals refer to like elements throughout. In the drawings, the thickness, ratio, and dimension of components are exaggerated for effective description of the technical content.

The terminology used herein is for the purpose of describing particular embodiments only and is not intended to be limiting. As used herein, the singular forms, "a", "an" and "the" are intended to include the plural forms as well, unless the context clearly indicates otherwise. As used herein, the term "and/or" includes any and all combinations of one or more of the associated listed items. For example, "an element" has the same meaning as "at least one element," unless the context clearly indicates otherwise. "At least one" is not to be construed as limiting "a" or "an." "Or" means "and/or."

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

Spatially relative terms, such as "beneath," "below," "lower," "above," "upper" and the like, may be used herein for ease of description to describe one element or feature's relationship to another element(s) or feature(s) as illustrated in the figures.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A protective film is applied to a display device to protect a display screen of the display device. When an adhesive strength of the protective film is relatively weak, the protective film is detached from the display screen within the display device, and when the adhesive strength of the protective film is relatively strong, the display screen is damaged during replacement of the protective film within the display device.

Hereinafter, the present disclosure will be explained in detail with reference to the accompanying drawings.

Figure 2:
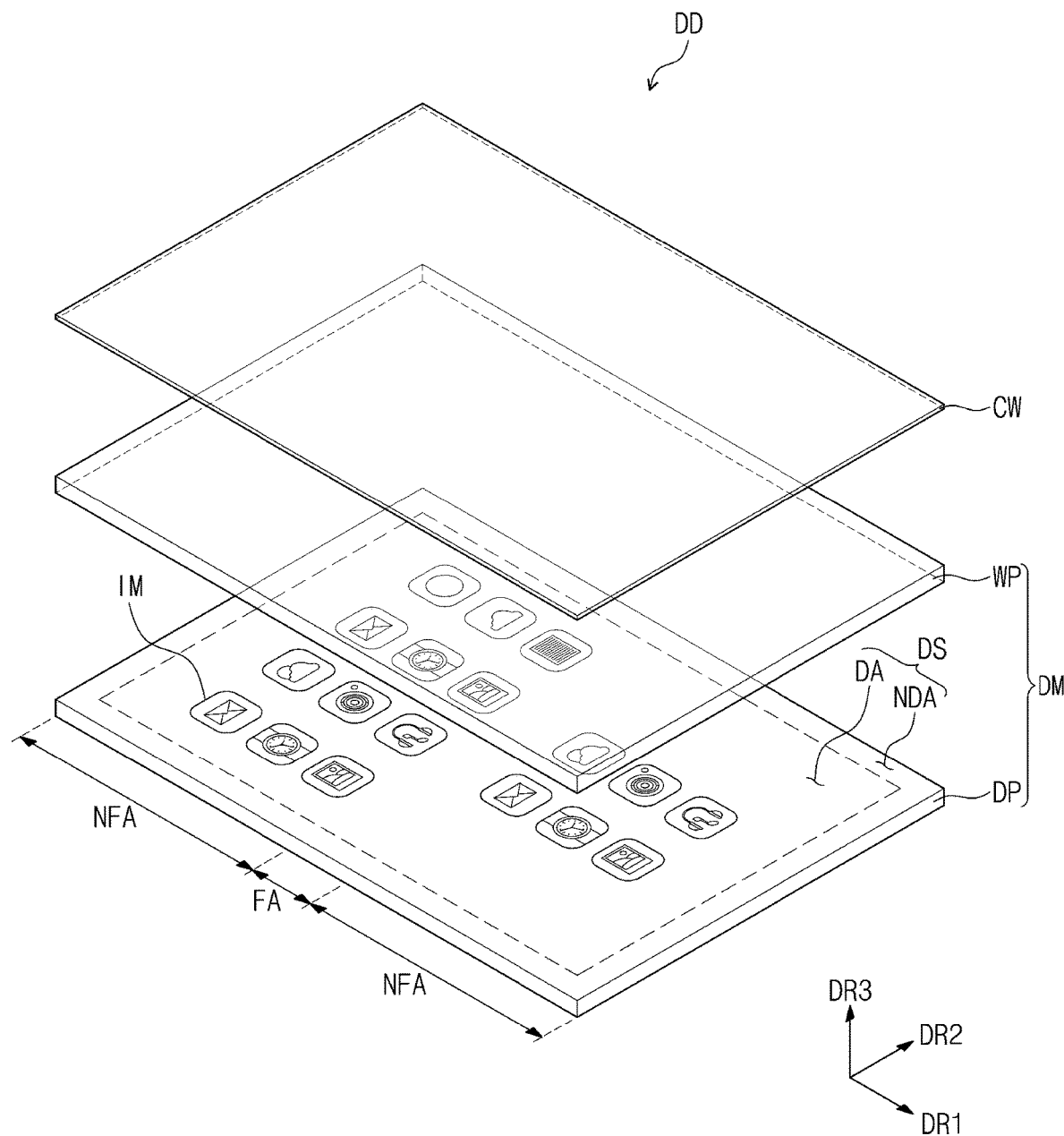
FIG. 2 is an exploded perspective view showing an exemplary embodiment of a display device.
Figure 3:
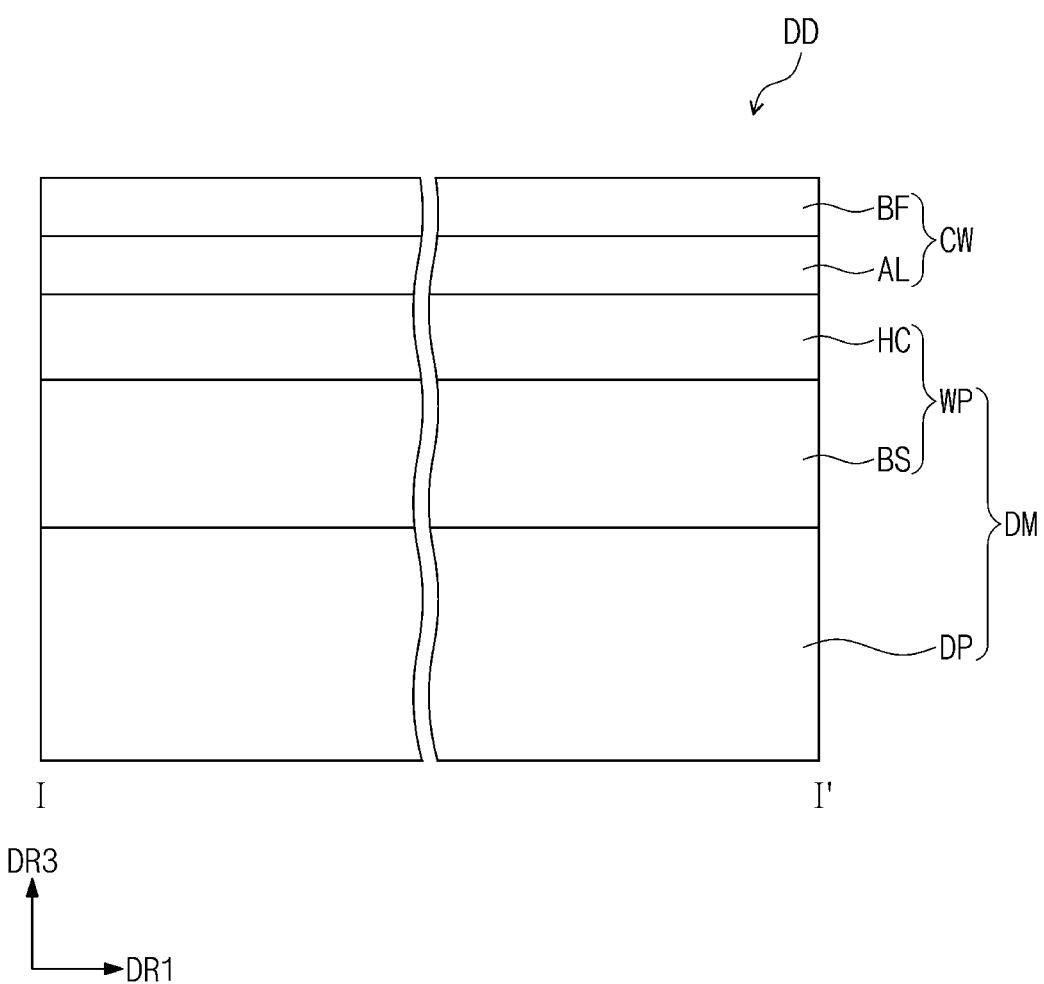
FIG. 3 is a cross-sectional view showing an exemplary embodiment of a display device.

FIG. 1 is a perspective view showing an exemplary embodiment of a display device DD. FIG. 2 is an exploded perspective view showing the display device DD shown in FIG. 1. FIG. 3 is a cross-sectional view taken along line I-I' of FIG. 1 of an exemplary embodiment of a display device DD including a protective film CW FIGS. 4A, 4B, and 5A to 5C are cross-sectional views showing exemplary embodiments of a display device DD. The display device DD and components thereof may be disposed in a plane defined by a first direction DR1 and a second direction DR2 which cross each other. A thickness (e.g., thickness direction) of the display device DD and components thereof, may be defined along a third direction DR3 which crosses each of the first direction DR1 and the second direction DR2.

A display device DD may include a display area DA at which an image IM is displayed and a non-display area NDA defined adjacent to the display area DA. The image IM is not displayed at the non-display area NDA. In FIG. 1, the non-display area NDA of the display device DD is shown to surround the display area DA, however, the present disclosure should not be limited thereto or thereby. One or more components of the display device DD may include a display area DA and a non-display area NDA corresponding to the display area DA and the non-display area NDA described above for the display device DD. The display device DD may include or define a display surface DS at which the image IM is displayed, where the image displayed at the display surface DS is visible from outside the display device DD.

The display device DD may be flexible. The display device DD which is flexible may be folded, bent, maintained folded and/or maintained bent. In the present disclosure, the term "flexible" used herein may mean a property of being bendable, should not be limited to a structure that is curved to be completely folded, and may mean a structure in which the display device is bent at a level (e.g., distance, radius, etc.) of several nanometers (nm).

Referring to FIGS. 2 and 3, the display device DD may include a display panel DP, a window member WP disposed on the display panel DP, and a protective film CW. A display module DM may include the display panel DP and the window member WP together. The display module DM may generate the image IM. In an exemplary embodiment, the display panel DP of the display module DM generates the image IM, and the window member WP and the protective film CW transmit the image IM from the display panel DP to outside the display device DD along the third direction DR3. The window member WP may include a base substrate BS and a hard coating layer HC which is disposed on the base substrate BS and is relatively hard. The display panel DP may define the display screen, without being limited thereto. The image IM may be visible through the window member WP and/or the protective film CW, from outside the display device DD, without being limited thereto.

The protective film CW may be included in the display device DD. The protective film CW may be disposed on the hard coating layer HC to protect the display module DM that includes the hard coating layer HC. The protective film CW may face the display panel DP with the window member WP therebetween. The protective film CW may face the base substrate BS with the hard coating layer HC therebetween. The protective film CW may be transparent, and thus, image information provided by the display panel DP of the display module DM may be viewable from outside the display device DD even when the protective film CW is attached within the display device DD. The protective film CW may be disposed directly on the hard coating layer HC, without being limited thereto. The protective film CW may form an interface with the hard coating layer HC, without being limited thereto.

The protective film CW may include a polymer film BF and an adhesive layer AL which is disposed on one surface of the polymer film BF. The polymer film BF may face the display module DM with the adhesive layer AL therebetween. The polymer film BF may define an outer surface of the display device DD, without being limited thereto. In the display device DD, the adhesive layer AL may contact the window member WP, such as to form an interface therewith. The protective film CW is attachable to the display module DM at or by the adhesive layer AL. The protective film CW is detachable from the display module DM at or by the adhesive layer AL. Adhesive strength and haze value of the adhesive layer AL may vary based on time and/or at what temperature the protective film CW including the adhesive layer AL is attached within the display device DD.

In exemplary embodiments, the adhesive layer AL may have a first adhesive strength in a first state of the protective film CW and may have a second adhesive strength in a second state of the protective film CW, and the second adhesive strength may be equal to or smaller than about 25% of the first adhesive strength.

In addition, the adhesive layer AL of the protective film CW may have a combination of the first adhesive strength and a first haze value in the first state of the protective film CW, and may have a combination of the second adhesive strength and a second haze value in the second state of the protective film CW.

The first state may indicate a state in which a time elapses after the protective film CW is attached to the window member WP, e.g., an adhered surface, and the first state may be a state under a room temperature condition. The first state may be a state in which a value of the adhesive strength is maintained without increasing after the protective film CW is attached to the window member WP, e.g., the adhered surface. In an exemplary embodiment, for example, the first state may be a state in which one or more hours has elapsed after the protective film CW is attached to the window member WP, e.g., the adhered surface. That is, the protective film CW attached to the window member WP for a time, at room temperature and/or after a maximum adhesive strength relative to the window member WP is achieved, may define the first state of the display device DD or protective film CW.

The second state may indicate a state after a heat or ultraviolet ("UV") ray is provided to the adhesive layer AL from the first state of the protective film CW. In an exemplary embodiment, for example, the second state may indicate a state after providing heat of about 80 degrees Celsius (° C.) or more to a structure of the protective film CW attached to the window member WP defining the first state and/or irradiating an ultraviolet light ray of about 405 nm wavelength at about 3000 millijoules per square centimeter (mJ/cm$^2$) to the structure of the protective film CW attached to the window member WP defining the first state. That is, a structure of the protective film CW attached to the window member WP from the first state of the protective film CW, to which heat and/or ultraviolet light ray has been applied, may define the second state of the display device DD or protective film CW.

The protective film CW may have or define the first adhesive strength in the first state with respect to the adhered surface and may have the second adhesive strength in the second state with respect to the adhered surface. The adhered surface may correspond to the window member WP, and, in detail, the hard coating layer HC may be or define the adhered surface. The first adhesive strength may be within a range equal to or greater than about 200 grams-force per inch (gf/inch) and equal to or smaller than about 2000 gf/inch. That is, the protective film CW attached to the window member WP for a time, at room temperature and/or after a maximum adhesive strength relative to the window member WP is achieved, may define the first adhesive strength within a range equal to or greater than about 200 gf/inch and equal to or smaller than about 2000 gf/inch. Also, a structure of the protective film CW attached to the window member WP from the first state, to which heat and/or ultraviolet light ray has been applied, may define the second adhesive strength equal to or smaller than about 50 gf/inch.

The polymer film BF of the protective film CW may include at least one polymer resin of polyethylene terephthalate ("PET"), polybutylene terephthalate ("PBT"), polycarbonate ("PC"), polyethylene naphthalate ("PEN"), polystyrene ("PS"), polymethylmethacrylate ("PMMA"), polyvinylchloride ("PVC"), polyethersulfone ("PES"), polypropylene ("PP"), polyamide ("PA"), modified polyphenylene ether ("m-PPO"), polyoxymethylene ("POM"), polysulfone ("PSU"), polyphenylene sulfide ("PPS"), polyimide ("PI"), polyethyleneimine ("PEI"), polyether ether ketone ("PEEK"), polyamide imide ("PAI"), polyarylate ("PAR"), and thermoplastic polyurethane ("TPU").

The polymer film BF may have a thickness equal to or greater than about 25 micrometers (μm) and equal to or smaller than about 200 μm. More specifically, the polymer film BF may have a thickness equal to or greater than about 50 μm and equal to or smaller than about 100 μm.

The adhesive layer AL of the protective film CW may include an adhesive material for which an adhesive strength is defined decreased in the second state relative to the adhesive strength in the first state. According to an exemplary embodiment, adhesive layers AL and AL-1 in the second state may emit a nitrogen gas GN-a or may include a microcapsule MC.

In the protective film CW, the first haze value of the first state may be equal to or smaller than about 4, and the second haze value of the second state may be equal to or greater than about 5. That is, the first state may include the protective film CW having the first haze value equal to or smaller than about 4, and second state may include the protective film CW having the second haze value equal to or greater than about 5. In an exemplary embodiment, for example, when the haze value is equal to or smaller than about 4, the protective film CW may be in an optically transparent state, and thus, the image information provided by the display panel DP of the display module DM may be visible to outside the display device DD even when the protective film CW is attached to the window member WP within the display device DD. When the haze value is equal to or greater than about 5 due to a generation of a nitrogen gas GN-a or an expansion of a microcapsule MC-a, a decrease in the adhesive strength between the protective film CW and the display module DM may be observed.

In the protective film CW, the adhesive layers AL and AL-1 may have a thickness equal to or greater than about 10 μm and equal to or smaller than about 200 μm. More specifically, the adhesive layers AL and AL-1 may have the thickness equal to or greater than about 10 μm and equal to or smaller than about 50 μm.

According to an exemplary embodiment, an absolute value of a difference in refractive index between the polymer film BF and the adhesive layers AL and AL-1 may be equal to or smaller than about 0.1. As the difference in refractive index between the polymer film BF and the adhesive layers AL and AL-1 is controlled to be equal to or smaller than about 0.1, an optical transparency of the protective film CW may be improved.

In the protective film CW, the adhesive layers AL and AL-1 may be optically transparent. The adhesive layer AL and AL-1 may have a transmittance equal to or greater than about 89% in a visible light wavelength region. The adhesive layers AL and AL-1 may have the transmittance equal to or greater than about 89% in a light wavelength region from about 400 nm to about 800 nm during the first state of the protective film CW.

Figure 5A:
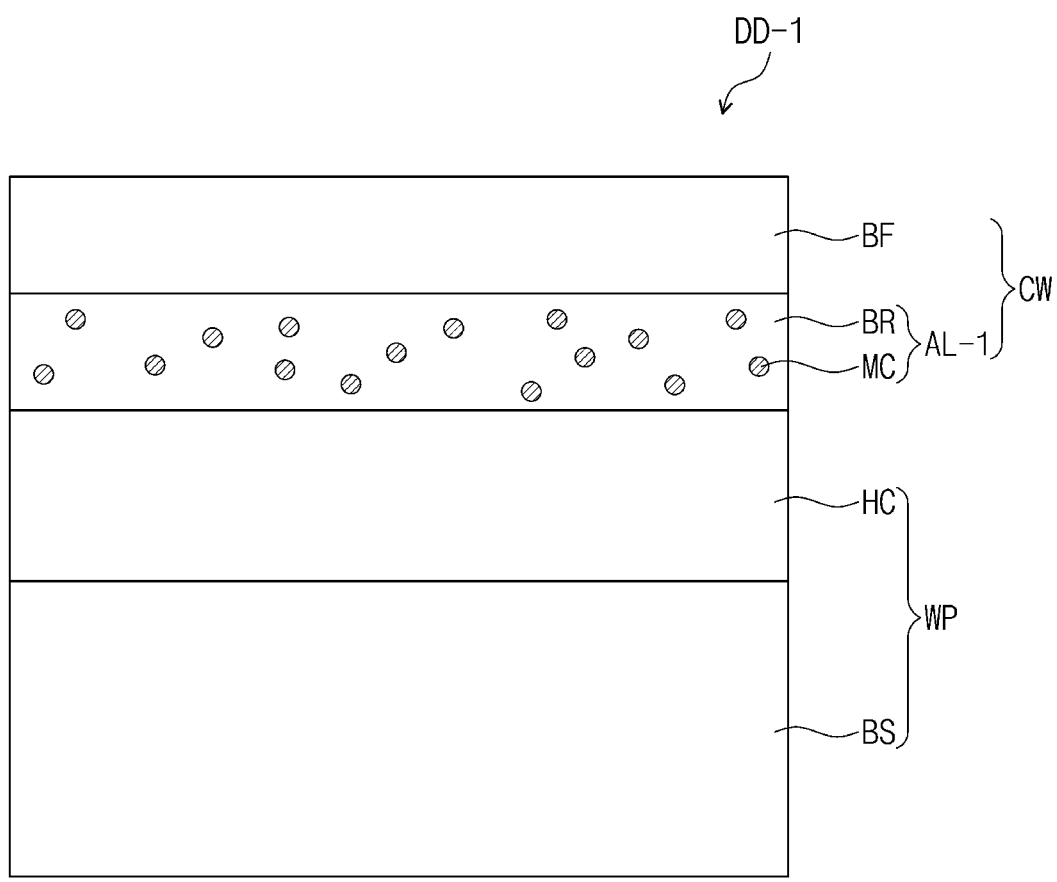
FIG. 5A is a cross-sectional view showing an exemplary embodiment of a protective film attached to a window member of a display device.

In the protective film CW shown in FIG. 5A, an absolute value of a difference in refractive index between a base resin BR of the adhesive layer AL-1, an outer coating portion OS of the microcapsule MC (refer to FIG. 5B, e.g., outer coating), and a core portion SB of the microcapsule MC (refer to FIG. 5B) may be equal to or smaller than about 0.1. As the difference in refractive index between the base resin BR, the outer coating portion OS, and the core portion SB is controlled to be equal to or smaller than about 0.1, the optical transparency of the protective film CW may be improved.

Figure 4A:
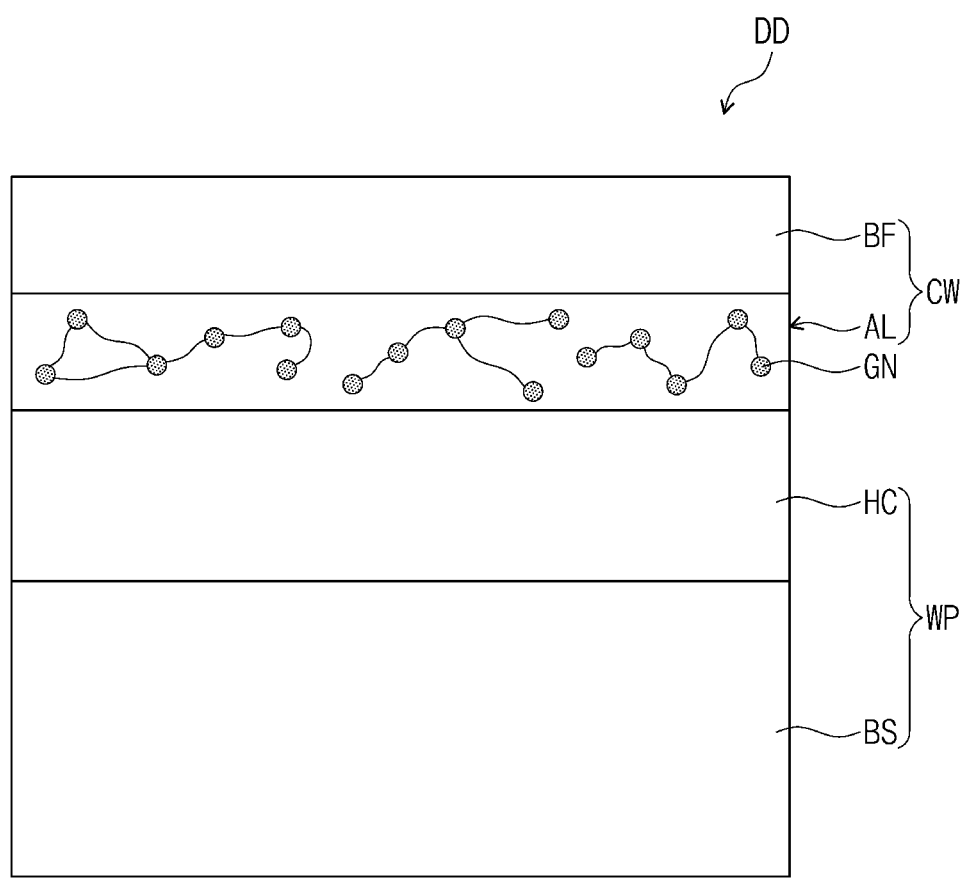
FIG. 4A is a cross-sectional view showing an exemplary embodiment of a protective film attached to a window member of a display device.
Figure 4B:
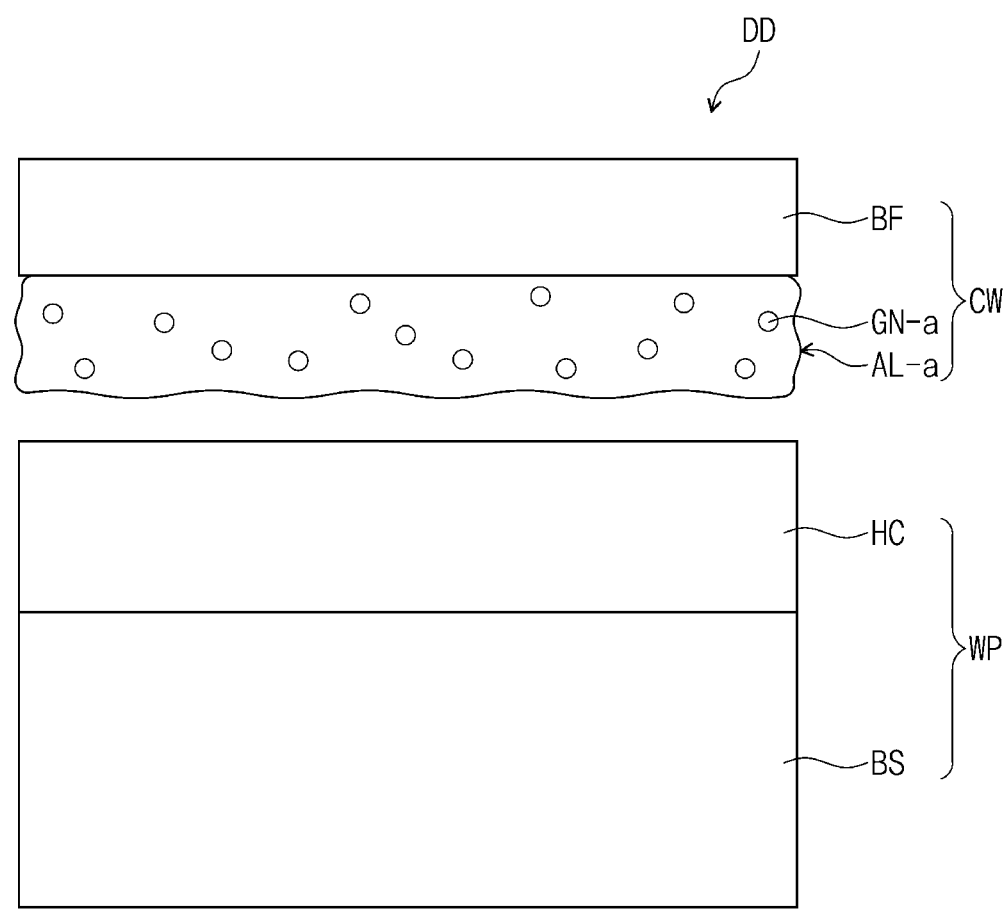
FIG. 4B is a cross-sectional view showing an exemplary embodiment of a protective film detached from a window member of a display device.

FIG. 4A is a cross-sectional view showing an exemplary embodiment of the protective film CW that includes the adhesive layer AL attached to the window member WP. FIG. 4B is a cross-sectional view showing an exemplary embodiment of the protective film that is detached from the window member WP at the adhesive layer AL-a. FIG. 4B is a cross-sectional view showing a structure of the protective film CW relative to the window member WP after the heat or ultraviolet ray described above is provided to the adhesive layer AL of display device DD of FIG. 4A. That is, FIG. 4A shows a portion of the display device DD for which the first state is defined by the protective film CW attached to the window member WP for a time, at room temperature and/or after a maximum adhesive strength relative to the window member WP is achieved, and FIG. 4B shows a portion of the display device DD for which in the second state is defined by heat and/or ultraviolet light ray application to the protective film CW attached to the window member WP from the first state.

In the exemplary embodiment shown in FIG. 4A, the adhesive layer AL may include at least one of an azo-based compound and an azide-based compound, which contains a nitrogen atom GN (e.g., nitrogen). In an exemplary embodiment, for example, the adhesive layer AL may include at least one of 2,2'-azobis(N-butyl-2-methylpropionamide), 2,2'-azobis[2-methyl-N-[1,1-bis(hydroxymethyl)-2-hydroxyethyl]-propionamide, 3-(azidomethyl)-3-methyloxetane, and 2-azidobenzene-1,4-dicarboxylic acid.

According to an exemplary embodiment, the adhesive strength of the adhesive layer AL may be reduced under a condition that the heat or ultraviolet ray described above is provided to the protective film CW of the display device DD which is attached to the window member WP from the first state. When the heat or ultraviolet ray is provided to the adhesive layer AL in the first state of the protective film CW, the nitrogen gas GN-a corresponding to the nitrogen atom GN may be discharged from the adhesive layer AL, and the adhesive layer AL in the first state (FIG. 4A) may be converted to the adhesive layer AL-a in the second state (FIG. 4B). The adhesive strength of the adhesive layer AL-a of the second state may be reduced to about 25% or less of the adhesive strength of the adhesive layer AL of the first state, and thus, the protective film CW may be easily detached from the window member WP (FIG. 4B). The adhesive layer AL-a of the second state may be a deformed state in which the nitrogen gas GN-a is generated and discharged from the adhesive layer AL of the first state which includes 2,2'-azobis(N-butyl-2-methylpropionamide), 2,2'-azobis[2-methyl-N-[1,1-bis(hydroxymethyl)-2-hydroxyethyl]-propionamide, 3-(azidomethyl)-3-methyloxetane, or 2-azidobenzene-1,4-dicarboxylic acid.

Figure 5B:
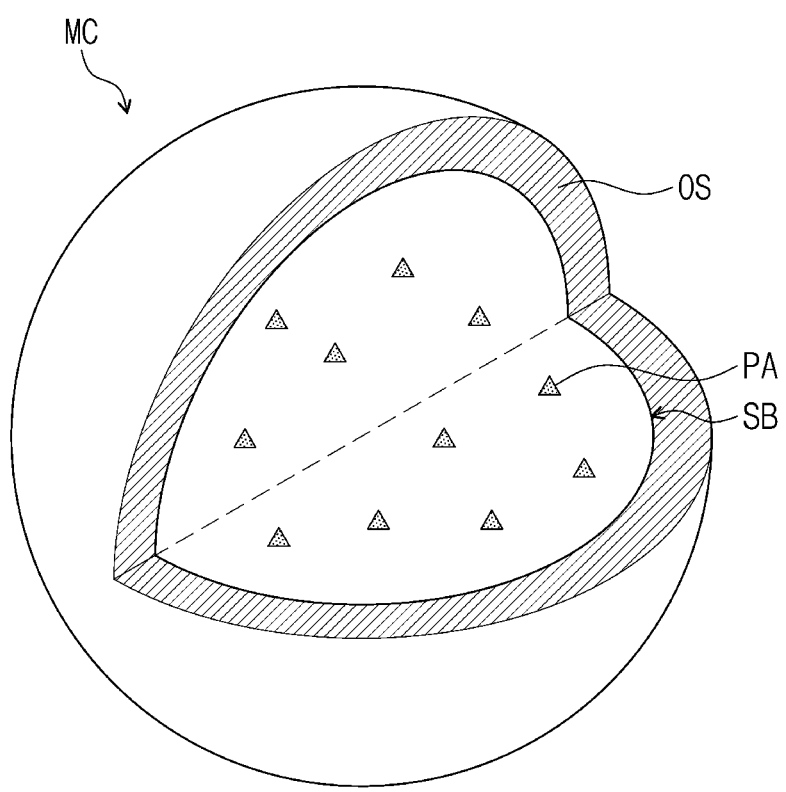
FIG. 5B is a perspective view schematically showing an exemplary embodiment of a microcapsule of an adhesive layer of a protective film.
Figure 5C:
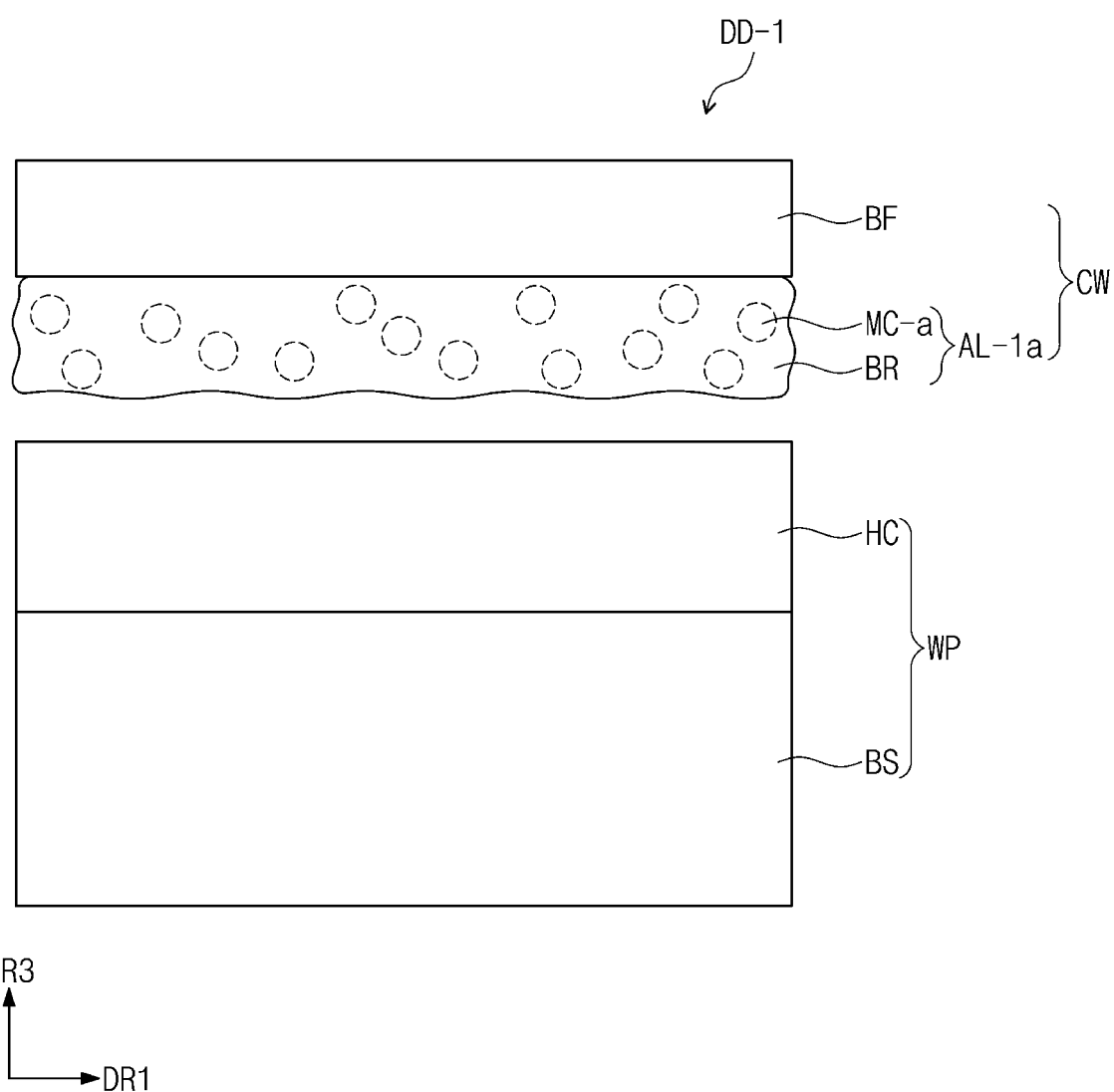
FIG. 5C is a cross-sectional view showing an exemplary embodiment of a protective film detached from a window member of a display device.

FIG. 5A is a cross-sectional view showing an exemplary embodiment of a display device DD-1 including the protective film CW that includes the adhesive layer AL-1 having the microcapsule MC and attached to the window member WP. FIG. 5B is a perspective view showing an exemplary embodiment of the microcapsule MC included in the adhesive layer AL-1. FIG. 5C is a cross-sectional view showing an exemplary embodiment of the display device DD-1 including the protective film CW that includes an adhesive layer AL-1a having a microcapsule MC-a and detached from the window member WP. FIG. 5C is a cross-sectional view showing a structure of the protective film CW relative to the window member WP after the heat or ultraviolet ray described above is provided to the adhesive layer AL-1 of the display device DD-1 of FIG. 5A. That is, FIG. 5A shows a portion of the display device DD-1 for which the first state is defined by the protective film CW attached to the window member WP for a time, at room temperature and/or after a maximum adhesive strength relative to the window member WP is achieved, and FIG. 5C shows a portion of the display device DD-1 for which the second state is defined by heat and/or ultraviolet light ray application to the protective film CW attached to the window member WP from the first state.

According to an exemplary embodiment, the adhesive layer AL-1 may include a base resin BR and the microcapsule MC which is distributed in the base resin BR.

The base resin BR may include at least one of an acrylic-based resin (e.g., resin including acrylic), a silicone-based resin (e.g., resin including silicone), a urethane-based resin (e.g., resin including urethane), an epoxy-based resin (e.g., resin including epoxy), a rubber-based resin (e.g., resin including rubber), and a polyester-based resin (e.g., resin including polyester). In an exemplary embodiment, for example, the base resin BR may include one or more of the acrylic-based resin, the silicone-based resin, the urethane-based resin, the epoxy-based resin, the rubber-based resin, and the polyester-based resin.

The microcapsule MC may include the core portion SB and the outer coating portion OS which surrounds the core portion SB. The core portion SB may include an adhesive strength modifier PA therein.

The outer coating portion OS of the microcapsule MC may include at least one of gelatin, natural gum, polyester, and polyamide.

The core portion SB included in the microcapsule MC may include at least one adhesive strength modifier PA among poly(2-ethylhexyl acrylate, polybutylacrylate, polyvinylacetate, polymethylmethacrylate, polyethylacrylate, polymethylacrylate, polybenzylacrylate, polyphenoxyethylacrylate, polyacrylicacid, polyhydroxyethylmethacrylate, polyglycidylmethacrylate, and polyacetoacetoxyethylmethacrylate.

According to an exemplary embodiment, the adhesive strength of the adhesive layer AL-1 may be reduced under a condition that the heat or ultraviolet ray described above is provided to the protective film CW of the display device DD-1 which is attached to the window member WP from the first state. The adhesive strength modifier PA included in the core portion SB may be evaporated by providing the heat or ultraviolet ray to the adhesive layer AL-1 of the first state, and the evaporated adhesive strength modifier PA may be discharged to the outside of the microcapsule MC, thereby converting the adhesive layer AL-1 including the microcapsule MC of the first state (FIG. 5A) to the adhesive layer AL-1a including the microcapsule MC-a of the second state (FIG. 5C). The adhesive strength of the adhesive layer AL-1a of the second state may be reduced to about 25% or less of the adhesive strength of the adhesive layer AL-1 in the first state, and thus, the protective film CW may be easily detached from the window member WP (FIG. 5C). The adhesive layer AL-1a of the second state may be a deformed state in which the adhesive strength modifier PA is discharged from the microcapsule MC of the first state, and the adhesive layer AL-1 is deformed or converted to the adhesive layer AL-1a including the microcapsule MC-a.

In the exemplary embodiment, a content of the microcapsule MC may be equal to or greater than about 1 weight percent (wt %) and equal to or smaller than about 30 wt %, based on a total weight of the base resin BR and the microcapsule MC within the adhesive layer AL-1.

The microcapsule MC may be randomly distributed in the base resin BR. The microcapsule MC distributed in the base resin BR of the adhesive layer AL-1 may be provided in a plural number (e.g., microcapsules MC), and the microcapsules MC may have a same particle size as each other or different particle sizes from each other.

The microcapsule MC may have a spherical shape, however, is not limited thereto and the microcapsule MC may have an ellipsoid shape. In an exemplary embodiment, for example, the microcapsule MC may have a circular or ellipse shape in cross section.

According to an exemplary embodiment, the first adhesive strength of the protective film CW including the adhesive layers AL and AL-1 with respect to the hard coating layer HC may be within a range equal to or greater than about 200 gf/inch and equal to or smaller than about 2000 gf/inch. When the first adhesive strength with respect to the hard coating layer HC is less than about 200 gf/inch, the protective film CW may be detached from a surface of the display module DM when the display device DD is folded, since the adhesive strength with respect to the surface of the display module DM is insufficient to maintain attachment of the protective film CW within the display device DD. In addition, when the first adhesive strength with respect to the hard coating layer HC exceeds about 2000 gf/inch, the protective film CW including the adhesive layers AL and AL-1 may not be easily detached from the surface of the display module DM when the protective film CW is replaced.

The adhesive strength of the adhesive layers AL and AL-1 may be adjusted depending on hardness of the base resin BR, surface energy, and/or tackifier.

Table 1 below shows evaluation results for comparative examples and embodiment examples of the protective film CW. The evaluation for the protective film CW of comparative examples and of embodiment examples was conducted by measuring for an adhesive layer AL, the first adhesive strength of the first state, the second adhesive strength of the second state, the first haze value of the first state, and the second haze value of the second state. In addition, whether detachment occurs in a folding test, whether a component (e.g., display module DM or display panel DP) is damaged when the protective film CW is replaced, a visual inspection on whether the heat or ultraviolet ray is irradiated, and a variation of the adhesive layer AL in use were observed to evaluate reliability when the protective film CW is applied to the display device DD.

Embodiment examples 1 to 6 show evaluation results with respect to the display device DD including the protective film CW shown in FIG. 3, and comparative examples 1 to 5 show evaluation results with respect to a comparative display device including a comparative protective film having different compositions from those of the embodiment examples.

Comparative examples 1 and 2 include a comparative protective film to which a gas generation mechanism is applied, but include different content of thermal expansion microcapsule from those of embodiment examples 1 to 4. Comparative example 3 corresponds to a comparative display device that includes a comparative protective film to which the gas generation mechanism or a thermal expansion microcapsule is not applied. Comparative example 4 corresponds to a comparative display device that includes a comparative protective film having a comparative adhesive layer containing a ultraviolet ray curable adhesive, and

TABLE 1

| | Adhesive layer composition | First adhesive strength | Second adhesive strength | First haze value | Second haze value | Detachment during folding operation | Panel damage during replacement | Visual inspection on whether heat or UV ray is provided | Variation of adhesive layer in use |
|---|---|---|---|---|---|---|---|---|---|
| Embodiment example 1 | Gas generation | 500 | 10 | 4 | 22 | Not detached | Not damaged | Possible | Not varied |
| Embodiment example 2 | Gas generation | 200 | 10 | 3 | 18 | Not detached | Not damaged | Possible | Not varied |
| Embodiment example 3 | Gas generation | 500 | 50 | 2 | 12 | Not detached | Not damaged | Possible | Not varied |
| Embodiment example 4 | Gas generation | 200 | 50 | 2 | 5 | Not detached | Not damaged | Possible | Not varied |
| Embodiment example 5 | Thermal expansion particle | 500 | 5 | 4 | 32 | Not detached | Not damaged | Possible | Not varied |
| Embodiment example 6 | Thermal expansion particle | 200 | 0 | 3 | 27 | Not detached | Not damaged | Possible | Not varied |
| Comparative example 1 | Gas generation | 150 | 10 | 3 | 15 | detached | Not damaged | Possible | Not varied |
| Comparative example 2 | Gas generation | 500 | 70 | 4 | 5 | Not detached | Damaged | Possible | Not varied |
| Comparative example 3 | Normal | 500 | 500 | 2 | 2 | Not detached | Damaged | Impossible | Not varied |
| Comparative example 4 | UV curing | 500 | 20 | 3 | 3 | Not detached | Not damaged | Impossible | Varied |
| Comparative example 5 | Thermal expansion particle | 500 | 10 | 45 | 82 | Not detached | Not damaged | Possible | Not varied |

The first and second adhesive strengths were measured by a detachment test method of the 180 degrees (0), and the first and second haze values were measured by a haze meter. The detachment during the folding operation was evaluated by visually observing the detachment of the protective film CW when the display device DD together with the protective film CW was repeatedly folded and unfolded about 200,000 times. The panel damage during the replacement was evaluated by visually observing whether the display panel DP was damaged when the protective film CW was removed from the display panel DR. The visual inspection on whether the heat or ultraviolet ray was provided was conducted to evaluate whether visual inspection of the detachment state was easy (e.g., could be done without visual aid). The evaluation on the variation of the adhesive layer AL in use was conducted to determine whether the adhesive layer AL of the protective film CW was denatured during use after the protective film CW was attached.

comparative example 5 corresponds to a comparative display device that includes a comparative protective film having the thermal expansion microcapsule that is optically opaque.

Comparative example 1 has the first adhesive strength equal to or smaller than about 200 gf/inch, and it was found that the detachment phenomenon occurred when the comparative display device was folded. Comparative examples 2 and 3 have the second adhesive strength exceeding about 50 gf/inch, and it was found that the comparative display panel of the comparative display device was damaged when the comparative protective film was replaced. In comparative example 4, the first haze value and the second haze value are the same as each other, and thus, it was impossible to visually check the variation from the first state to the second state with naked eyes. In comparative example 5, the first haze value is greater than 4, and thus, it was impossible to view the image information provided through the comparative display panel of the comparative display module.

Embodiment example 1 to embodiment example 6 may have the first adhesive strength equal to or greater than about 200 gf/inch and equal to or smaller than about 2000 gf/inch and the second adhesive strength equal to or smaller than about 50 gf/inch, and thus, it was found that the detachment phenomenon did not occur when the display device DD was folded and the display panel DP was not damaged when the protective film CW was replaced.

In addition, since the first haze value is equal to or smaller than about 4 and the second haze value is equal to or greater than about 5 in embodiment example 1 to embodiment example 6, it was found that it was possible to visually check the variation within the stacked structure of the display device DD, from the first state to the second state owing to the variation in haze value.

Figure 6:
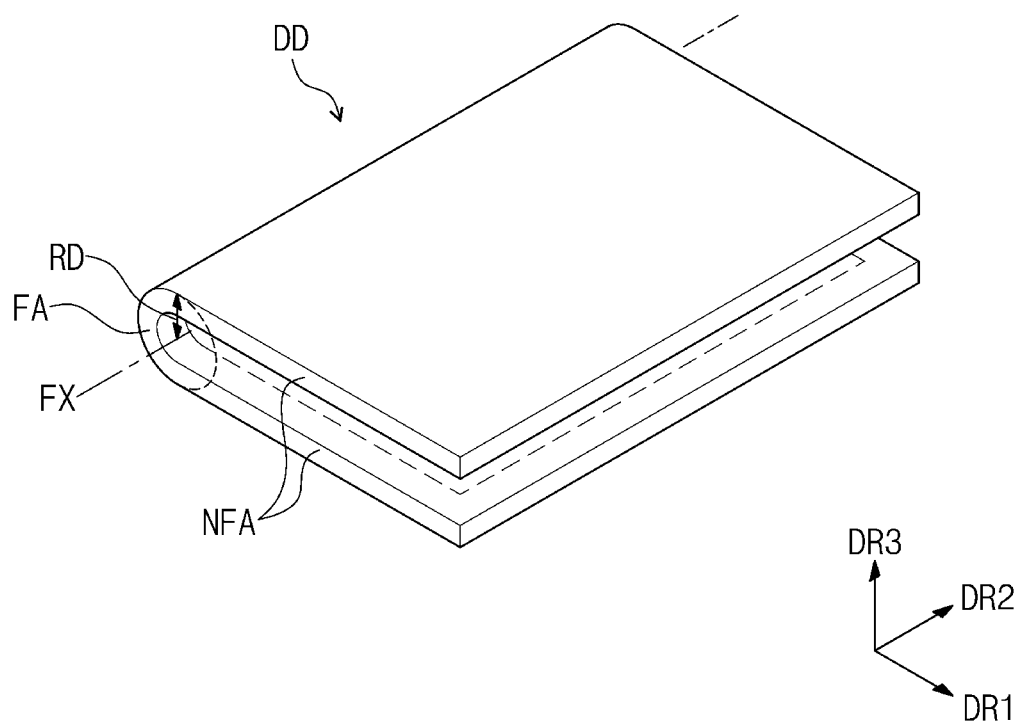
FIG. 6 is a perspective view showing an exemplary embodiment of the display device shown in FIG. 1, which is folded.
Figure 7:
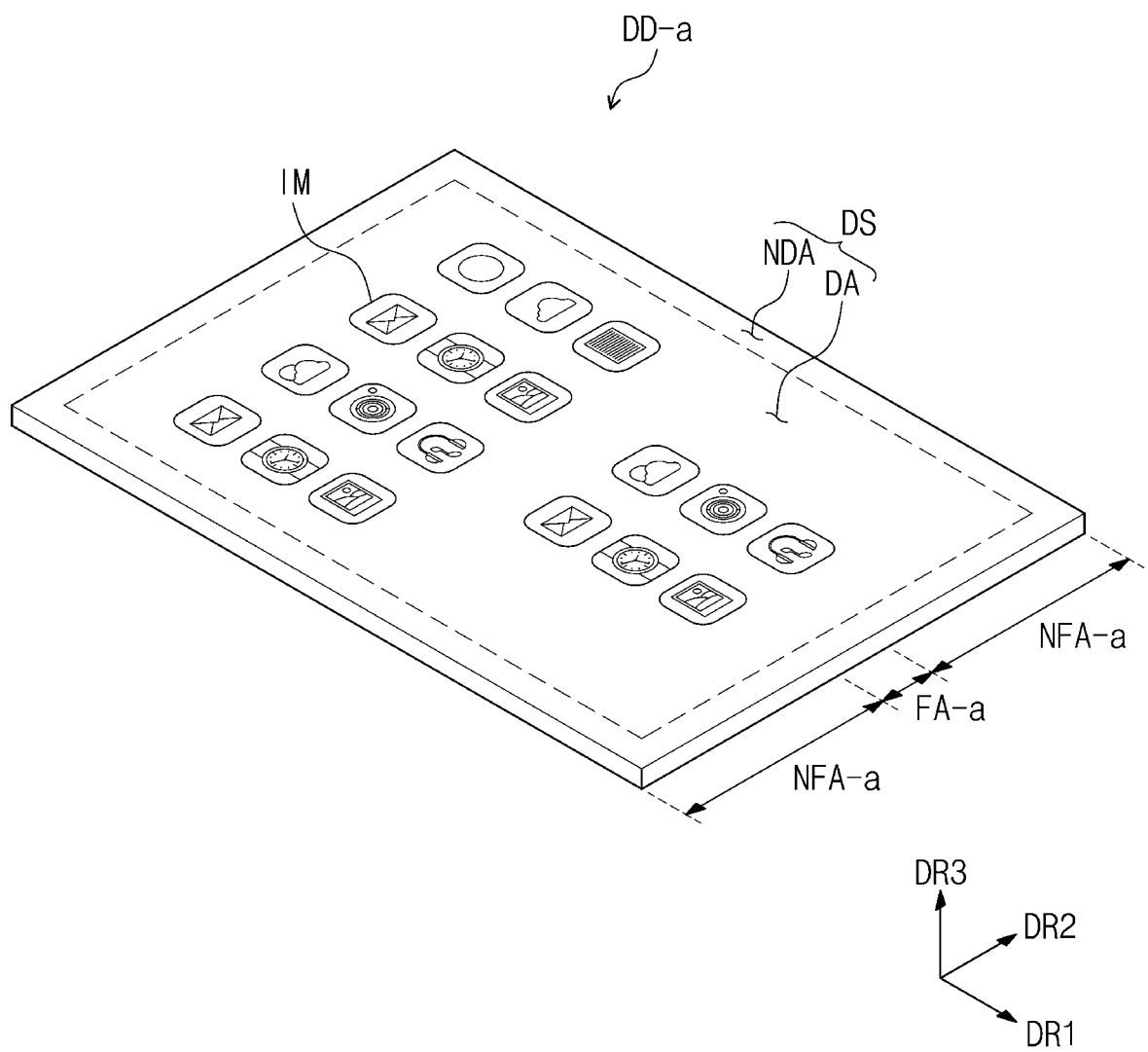
FIG. 7 is a perspective view showing an exemplary embodiment of a display device.
Figure 8:
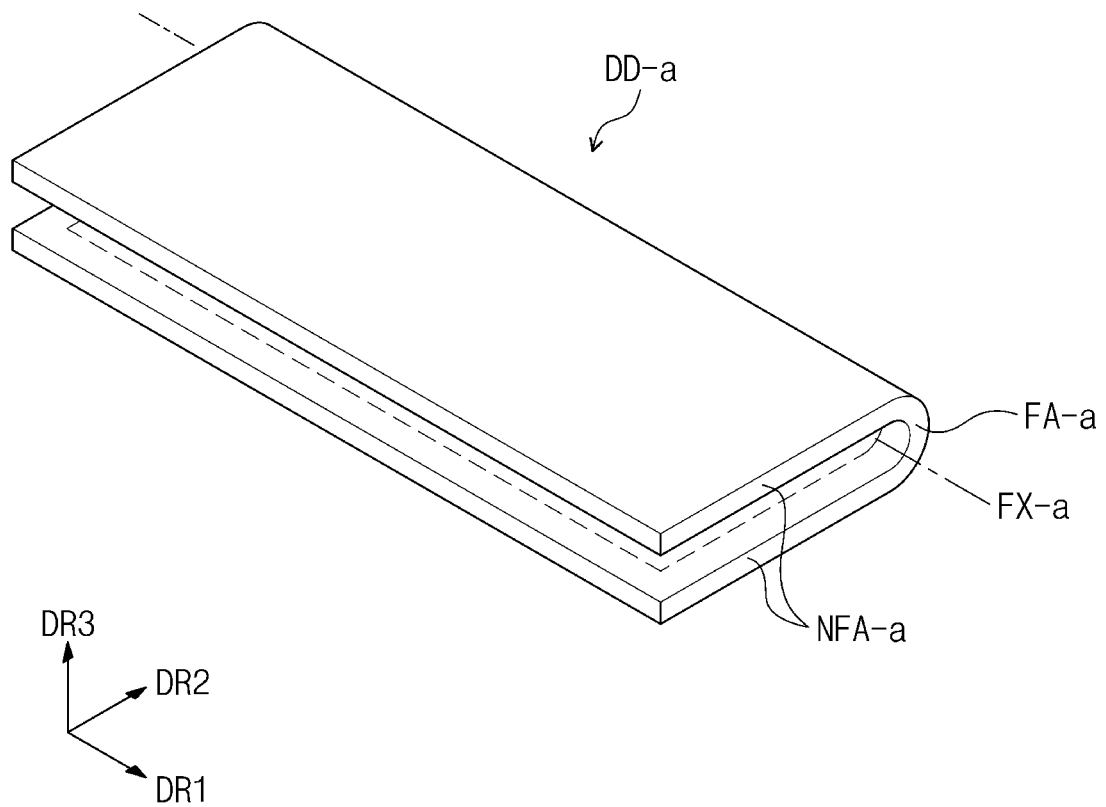
FIG. 8 is a perspective view showing the display device shown in FIG. 7, which is folded.

FIG. 6 is a perspective view showing an exemplary embodiment of the display device DD of FIG. 1, which is folded. FIG. 7 is a perspective view showing an exemplary embodiment of a display device DD-a. FIG. 8 is a perspective view showing the display device DD-a of FIG. 7, which is folded.

Referring to FIGS. 1 and 7, the display surface DS may include folding areas FA and FA-a at which the display devices DD and DD-a and components thereof are foldable and non-folding areas NFA and NFA-a respectively adjacent to the folding areas FA and FA-a and at which the display devices DD and DD-a and components thereof are not foldable (e.g., remain flat).

Referring to FIG. 6, the display device DD may be inwardly folded (e.g., in-folding or in-folded) with respect to a folding axis FX which extends along the second direction DR2. Referring to FIG. 8, the display device DD-a may be inwardly folded with respect to a folding axis FX-a which extends along the first direction DR1.

FIGS. 6 and 8 show only the display devices DD and DD-a inwardly folded with respect to the folding axis FX and the folding axis FX-a, respectively. However, the display devices DD and DD-a should not be limited thereto or thereby. That is, the display devices DD and DD-a may be outwardly folded (e.g., out-folding or out-folded) with respect to the folding axis FX and the folding axis FX-a, respectively. In other words, the display device DD may be inwardly or outwardly folded with respect to the folding axis FX, and the display device DD-a may be inwardly or outwardly folded with respect to the folding axis FX-a.

In the present disclosure, the in-folding may indicate that the display device DD or DD-a is folded such that portions of the display area DA or display surface DS face each other, and the out-folding may indicate that the display device DD or DD-a is folded such that portions of the display area DA or display surface DS face away from each other.

When the display device DD and DD-a is folded with respect to at least one of the folding axis FX and FX-a, a radius of curvature RD with respect to the at least one of the folding axis FX and FX-a may be within a range equal to or greater than about 1 millimeter (mm) and equal to or smaller than about 5 mm. Referring to FIG. 6, when the display device DD is folded with respect to one of the folding axis FX, the radius of curvature RD may be within a range equal to or greater than about 1 mm and equal to or smaller than about 5 mm.

That is, the display devices DD and DD-a may include the protective film CW (refer to FIG. 2) according to one or more exemplary embodiment described above, and thus may have superior adhesive strength in the first state of the protective film CW. Accordingly, the protective film CW may maintain the adhesive strength without being detached from other components even though the display devices DD and DD-a are repeatedly folded together with the protective film CW Since the adhesive strength of the protective film CW (refer to FIG. 2) according to one or more exemplary embodiment described above is reduced in the second state of the protective film CW, the protective film CW may be easily selectively detached from another component and replaced, thereby maintaining the reliability of the display devices DD and DD-a.

One or more exemplary embodiment of the display device DD may include the protective film CW to which a gas generation mechanism and/or a thermal expansion microcapsule are applied. Thus, the display surface DS may not be damaged when the protective film CW is replaced, and the reduction of the adhesive strength of components within the display device DD may be checked with the naked eyes (e.g., without a visual aid).

One or more exemplary embodiment of the protective film CW included in the display device DD may include the polymer film BF and the adhesive layer AL which is disposed on the polymer film BF. Accordingly, the protective film CW may not be detached even though the display device DD is repeatedly folded and unfolded together with the protective film CW and may have good adhesive strength and durability.

Although exemplary embodiments of the present disclosure have been described, it is understood that the present disclosure should not be limited to these exemplary embodiments but various changes and modifications can be made by one ordinary skilled in the art within the spirit and scope of the present disclosure as hereinafter claimed.

Therefore, the disclosed subject matter should not be limited to any single embodiment described herein, and the scope of the invention shall be determined according to the attached claims.

What is claimed is:

1. A protective film comprising:
a display area through which an image is transmitted; and
in the display area of the protective film, each of:
  a polymer film;
  an adhesive layer disposed on the polymer film, the adhesive layer comprising:
    a base resin and a microcapsule which is in the base resin, and
    the microcapsule comprising:
      a core portion comprising an adhesive strength modifier including at least one of poly(2-ethylhexyl acrylate, polybutylacrylate, polyvinylacetate, polyethylacrylate, polymethylacrylate, polybenzylacrylate, polyphenoxyethylacrylate, polyacrylicacid, polyhydroxyethylmethacrylate, polyglycidylmethacrylate, and polyacetoacetoxyethylmethacrylate; and
      an outer coating surrounding the core portion; and
    a first adhesive strength in a first state, and a second adhesive strength in a second state in which a heat or ultraviolet ray is provided thereto,
      wherein the second adhesive strength is equal to or smaller than about 25% of the first adhesive strength.

2. The protective film of claim 1, wherein the protective film has a transmittance equal to or greater than about 89% in a light wavelength region from about 400 nanometers to about 800 nanometers.

3. The protective film of claim 1, wherein the adhesive layer comprises at least one of 2,2'-azobi s(N-butyl-2-methylpropionamide), 2,2'-azobis[2-methyl-N-[1,1-bis(hydroxymethyl)-2-hydroxyethyl]-propionamide, 3-(azidomethyl)-3-methyloxetane, and 2-azidobenzene-1,4-dicarboxylic acid.

4. The protective film of claim 3, wherein the adhesive layer discharges a nitrogen gas in the second state.

5. The protective film of claim 1, wherein
each of the base resin, the core portion, and the outer coating has a refractive index, and
an absolute value of a difference between the refractive index of the base resin, the refractive index of the core portion, and the refractive index of the outer coating is equal to or smaller than about 0.1.

6. The protective film of claim 1, wherein the adhesive strength modifier is discharged to an outside of the microcapsule in the second state.

7. The protective film of claim 1, wherein the outer coating comprises at least one of gelatin, natural gum, polyester and polyamide.

8. The protective film of claim 1, wherein the base resin comprises at least one of a resin including acrylic, a resin including silicone, a resin including urethane, a resin including epoxy, a resin including rubber and a resin including polyester.

9. The protective film of claim 1, wherein a content of the microcapsule is equal to or greater than about 1 wt % and equal to or smaller than about 30 wt % based on a total weight of the base resin and the microcapsule within the adhesive layer.

10. A display device comprising:
a display module foldable with respect to at least one folding axis, the display module including a display area through which an image is transmitted; and
a protective film disposed on the display module and comprising:
a display area which transmits the image from the display module and corresponds to the display area of the display module, and
the display area of the protective film comprising a polymer film and an adhesive layer which is disposed between the polymer film and the display module,
wherein
the adhesive layer comprises:
a base resin and a microcapsule which is in the base resin,
the microcapsule comprising:
a core portion comprising an adhesive strength modifier including at least one of poly(2-ethylhexyl acrylate, polybutylacrylate, polyvinylacetate, polyethylacrylate, polymethylacrylate, polybenzylacrylate, polyphenoxyethylacrylate, polyacrylicacid, polyhydroxyethylmethacrylate, polyglycidylmethacrylate, and polyacetoacetoxyethylmethacrylate; and
an outer coating surrounding the core portion, and
a first adhesive strength and a first haze value in a first state and has a second adhesive strength and a second haze value in a second state in which a heat or ultraviolet ray is provided to the adhesive layer,
wherein the second adhesive strength is equal to or smaller than about 25% of the first adhesive strength, and the second haze value is greater than the first haze value.

11. The display device of claim 10, wherein the display module comprises:
a display panel; and
a window member between the display panel and the protective film, wherein the window member directly contacts the adhesive layer of the protective film.

12. The display device of claim 10, wherein
each of the polymer film and the adhesive layer has a refractive index, and
an absolute value of a difference between the refractive index of the polymer film and the refractive index of the adhesive layer is equal to or smaller than about 0.1.

13. The display device of claim 10, wherein the protective film has a transmittance greater than about 89% in a light wavelength region from about 400 nanometers to about 800 nanometers.

14. The display device of claim 10, wherein the display module is inwardly foldable or outwardly folded with respect to the at least one folding axis.

15. The display device of claim 10, wherein the adhesive layer has a thickness equal to or greater than about 10 micrometers and equal to or smaller than about 200 micrometers.

16. The display device of claim 10, wherein the first adhesive strength with respect to the display module is equal to or greater than about 200 grams-force per square inch and equal to or smaller than about 2000 grams-force per square inch.

17. The display device of claim 10, wherein the second adhesive strength with respect to the display module is equal to or smaller than about 50 grams-force per square inch.

18. The display device of claim 10, wherein
the first haze value is equal or smaller than about 4, and
the second haze value is equal to or greater than about 5.

* * * * *